United States Patent

[11] 3,574,898

| [72] | Inventors | Richard A. Scott;<br>Clarence E. Rice, Oklahoma City, Okla. |
|---|---|---|
| [21] | Appl. No. | 810,317 |
| [22] | Filed | Mar. 25, 1969 |
| [45] | Patented | Apr. 13, 1971 |
| [73] | Assignee | said Rice assignor to said Scott |

[54] V-BELT TEMPORARY REPAIR KIT
6 Claims, 9 Drawing Figs.

[52] U.S. Cl. ........................................................ 24/32, 254/52
[51] Int. Cl. ....................................................... F16g 7/04
[50] Field of Search ........................................... 24/243.6, 31.2, 33 (V), 31 (H); 24/263.3; 287/60; 254/52; 24/33 (B), 31, 32, 33; 74/242.8

[56] References Cited
UNITED STATES PATENTS

| 622,286 | 4/1899 | Steinmetz | 287/60 |
| 762,060 | 6/1904 | Huhn | 24/243.6UX |
| 1,327,798 | 1/1920 | Backstrom | 24/33B |
| 1,402,560 | 1/1922 | Anthony | 24/31.2UX |
| 1,693,041 | 11/1928 | Morgan | 254/52 |
| 2,459,393 | 1/1949 | Raniville | 254/52 |
| 2,529,153 | 11/1950 | Hain | 24/263.3X |
| 2,575,412 | 11/1951 | Fechter | 24/263.3UX |
| 77,295 | 4/1868 | Krausch | 24/33B |

Primary Examiner—Donald A. Griffin
Attorney—Robert K. Rhea

ABSTRACT: A pair of belt end connectors are respectively connected in cooperating relation to opposing ends of a selected length of V-belt forming an endless V-belt replacement. A clamp means is removably engageable with the belt or belt connectors for drawing meeting ends of the belt toward each other.

Patented April 13, 1971
3,574,898
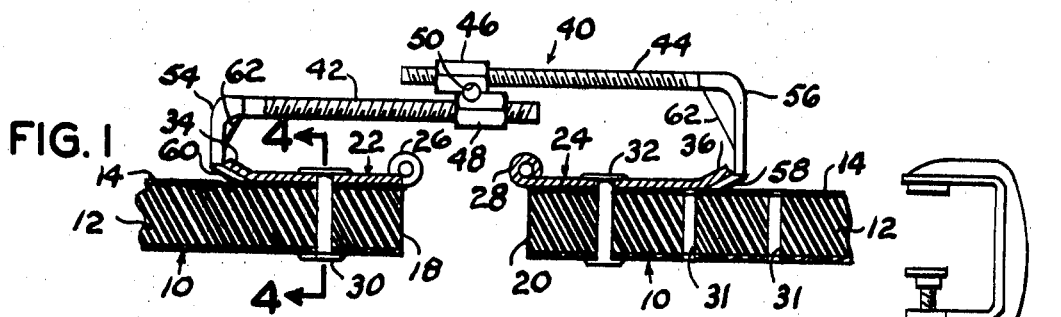
FIG. 1
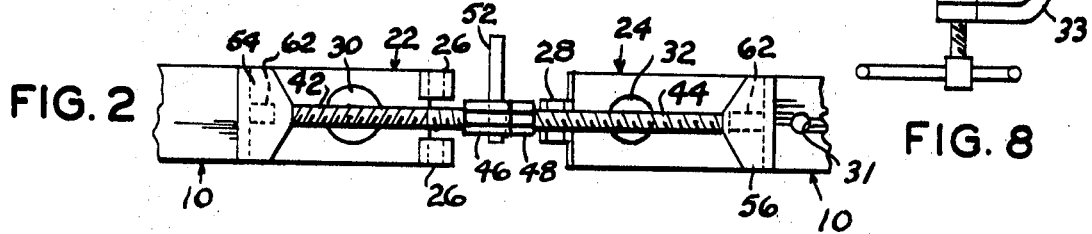
FIG. 2
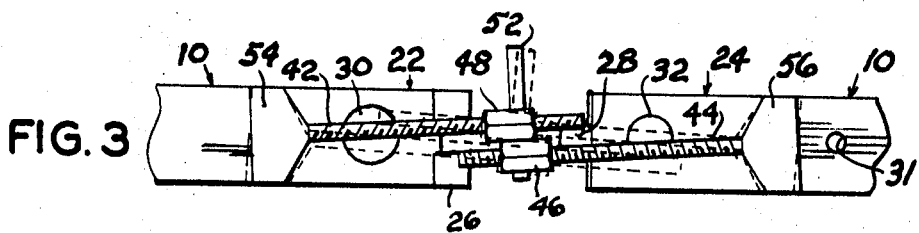
FIG. 3
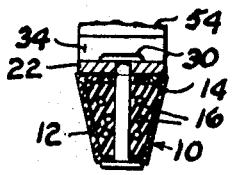
FIG. 4
FIG. 9
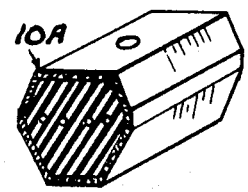
FIG. 5
FIG. 7
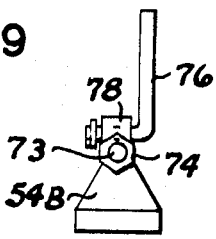
FIG. 6
RICHARD A. SCOTT
CLARENCE E. RICE
INVENTORS.
BY
*Robert K. Rhea*
AGENT

V-BELT TEMPORARY REPAIR KIT

BACKGROUND OF THE INVENTION

1. Field of the Invention

The present invention relates to automotive repair kits and more particularly to a means for temporarily replacing a broken fan belt, or the like.

Automotive fan belts sometimes fail or break while driving cross country and it is, therefore, desirable that some means be provided, other than a spare endless V-belt which requires special tools for its installation, by which a broken V-belt can be easily replaced with a minimum of tools, so that the vehicle may be driven to the nearest service station or repair shop without overheating the vehicle engine. Many automobiles now in use are equipped with a plurality of V-belts driving various components. The previous practice with some car owners or drivers has been the equipping of the vehicle with an extra fan belt but this is no longer practical for the reason that special tools and knowhow are usually required for installing the V-belt and adjusting the components driven thereby.

We have provided a solution to the above problem by providing a V-belt repair kit comprising an elongated section of V-belt and means for connecting a selected length of this belt around the pulleys driving a broken or damaged V-belt.

2. Description of the Prior Art

The prior art generally discloses tensioning tools for joining opposing ends of metallic members, such as wire, pipes, demountable wheel rims or railroad rails, but does not disclose, so far as we are aware, a means for drawing opposing ends of a V-belt together and effecting their connection when entrained around pulleys.

SUMMARY OF THE INVENTION

This V-belt repair kit includes an elongated length of V-belting and means for joining meeting ends of the belt. This means includes a pair of hingelike leaves, one leaf being secured to one end of the belting and a screw, or the like, for securing the other hinge leaf to an opposite end of the belt when cut off to the desired length. Turnbucklelike clamp elements, engaged with the hinge leaves and operated by a wrench or pin, pull the opposing ends of the belt toward each other when entrained around a pair of pulleys for replacement of a broken belt by inserting the hinge pin through the interdigitated portion of the hinge leaves. The turnbucklelike element is then removed manually.

The principal object is to provide an automotive temporary V-belt repair kit.

BRIEF DESCRIPTION OF THE DRAWINGS

FIG. 1 is a side elevational view of the device in operative position on a cross section of fragmentary end portions of a V-belt;

FIG. 2 is a top view of FIG. 1;

FIG. 3 is a view similar to FIG. 2 illustrating, by solid and dotted lines, the action of the turnbuckle element in drawing the belt ends toward each other;

FIG. 4 is a fragmentary vertical cross-sectional view taken substantially along the line 4—4 of FIG. 1;

FIGS. 5 and 6 are side elevational views of alternative embodiments of the turnbuckle means;

FIG. 7 is a left end view of FIG. 6;

FIG. 8 is a side elevational view of a rivet-installing C-clamp; and

FIG. 9 is a fragmentary perspective view, partially in section, of a double V-belt.

DESCRIPTION OF THE PREFERRED EMBODIMENTS

Like characters of reference designate like parts in those FIGS. of the drawings in which they occur.

In the drawings:

The reference numeral 10 indicates a length of substantially conventional V-belting formed of rubber 12 having a surrounding layer of woven fabric 14 and longitudinally extending reinforcing cords 16. The length of the belting 10 supplied is preferably at least as great as the circumferential length of the longest V-belt used on the automobile so that one end of the belt 10 may be severed or cut off as desired to a length substantially equal to the length of a broken belt, not shown, to be replaced thus forming opposing meeting end surfaces 18 and 20 of the belt 10. The belt ends 18 and 20 are joined in substantially abutting relation by a pair of hingelike leaves 22 and 24 having interdigitated hinge-pin-receiving loops 26 and 28, respectively. The hinge leaf 22 is preferably permanently joined to the outer surface or wider side of the V-belt by a rivet 30, or the like, so that its hinge-pin-receiving loop 26 overhangs the V-belt end surface 18, as viewed in FIG. 1. The belting is preferably longitudinally provided with a plurality of spaced-apart apertures 31 parallel with the rivet 30. The other hinge leaf 24 is similarly positioned on and connected with the other end portion 20 of the belt 10 by a rivet 32, or the like, inserted through the aperture 31 nearest the belt end 20. The rivet 32 is preferably tubular so that one of its ends may be flattened or upset by the use of a conventional C-clamp 33 (FIG. 8). Each of the hinge leaves 22 and 24 are provided, at their end portion opposite the hinge-pin-receiving loops, with an angular upwardly extending end portion 34 and 36 projecting away from the adjacent surface of the belt, as viewed in FIG. 1, for the purposes readily apparent.

While hinge-pin-receiving loops have been disclosed it seems obvious that these loops 26 and 28 may be replaced by cooperating J-shaped hooks, or the like, for joining the meeting ends of the belt.

A turnbucklelike clamp element, indicated generally at 40, is employed to draw the belt ends toward each other. The turnbuckle clamp element 40 comprises a pair of right- and left-hand threaded rods 42 and 44 threadedly engaged with a pair of nuts 46 and 48, respectively, which are joined, as by welding their flats, in juxtaposed relation. The joined section of the nuts are transversely apertured, as at 50, for receiving a leverlike pin, such as the hinge pin 52 (FIG. 2), and rotating the nuts about the longitudinal axes of the rods 42 and 44. The other end portion of the rods 42 and 44 are each joined, respectively, to substantially J-shaped hook members 54 and 56, respectively, each terminating in an angular shaped end portion 58 and 60 which cooperatively engage or hook under the leaf-end members 34 and 36, respectively. Each of the J-shaped hooks are reinforced by a web member 62.

The numeral 40A (FIG. 5) indicates an alternative embodiment of the turnbuckle means comprising a single right- and left-hand threaded rod 70 connected with cooperating nuts 46A and 48A secured to J-shaped hooks 54A and 56A which function in the manner described hereinabove for the hooks 54 and 56.

Similarly FIG. 6 illustrates another embodiment indicated at 40B wherein the hook-shaped end member 54B is rigidly joined to a nutlike sleeve 72 slidably receiving one end portion of a threaded rod 73 rigidly connected at its other end portion to the hook-shaped end member 56B. The hook-shaped end members 54B and 56B are drawn toward each other when engaged with the leaves 22 and 24 by a nut 74 threadedly engaged with the free end portion of the rod 72 and bearing against the sleeve 74. The nut 74 is rotated in the desired direction by an L-shaped handle 76 having one of its end portions journaled by a boss 78 secured to the nut 74 (FIG. 7).

Alternatively any one of the above-described clamp means may be formed with pinlike ends rather than the J-shaped hooks for entering the belt apertures 31 and drawing meeting ends of the belt together.

OPERATION

In operation the length of belting 10, having the hinge leaf 22 connected with the belt end portion 18, is cut to the desired length, as described hereinabove. The other hinge leaf 24 is installed on the belt end portion 20 in cooperative relation with the leaf 22 by inserting the rivet 32 through the belt and applying pressure to opposite ends of the rivet 32 by using the C-clamp 33 as mentioned hereinabove. This securely fastens the hinge leaf 24 to the belt and forms a reliable temporary repair. Alternatively a suitably sized bolt or the like may be used in joining the hinge leaf 24 to the belt. This length of belting 10 is then entrained around pulleys, not shown, in place of a broken belt and the turnbuckle means in extended position, is engaged with the upturned end portion of the hinge leaves. Thereafter the turnbuckle means is manually operated to draw the belt ends toward each other until the hinge-pin-receiving loops 26 and 28 will coaxially receive the hinge pin 52. Thereafter the turnbuckle means is manually released and removed.

The belting 10 may be substituted by belting of double V-belt configuration wherein opposing pulley-engaging sides of the belt, indicated at 10A (FIG. 9), are formed of different widths to compensate for the respective cross-sectional shape of the V-belt pulleys to be engaged. This type of belting is provided with an angularly woven fabric which permits entraining the belt around a V-belt pulley of relatively small diameter as is fully disclosed in U.S. Pat. No. 2,519,590, issued to L. W. Mitchell on Aug. 22, 1950.

Obviously the invention is susceptible to changes or alterations without defeating its practicability, therefore, we do not wish to be confined to the preferred embodiments shown in the drawings and described herein.

We claim:

1. An emergency V-belt repair kit, comprising: a length of V-belting; a pair of cooperating members adapted to be respectively secured to opposing end portions of said V-belt; said pair of members comprising a pair of hinge leaves having cooperating end portions provided with interdigitated hinge-pin-receiving loops; rodlike clamps means releasably engaging and drawing meeting ends of said belt toward each other when entrained around a pair of pulleys; and V-belt-engaging members secured to and projecting laterally of said clamp means in cooperative relation.

2. Structure as specified in claim 1 in which said hinge leaves are further characterized by offset end portions, opposite the interdigitated loops, projecting laterally on an obtuse angle with respect to the plane of each said hinge leaf.

3. Structure as specified in claim 2 in which said clamp means comprises right- and left-threaded nut-engaged rods forming a turnbuckle; and said V-belt engaging members comprising a cooperating laterally projecting substantially J-shaped hook formed on cooperating ends of said rods.

4. Structure as specified in claim 2 in which said clamp means includes a rod having right- and left-hand threaded end portions; a nut on the respective end portions of said rod; and cooperating laterally projecting hinge-leaf-engaging hooks secured to said nuts.

5. Structure as specified in claim 2 in which said clamp means includes an elongated threaded rod having a laterally projecting hinge-leaf-engaging first hook at one end; and sleeve slidable on said rod; a cooperating hinge-leaf-engaging second hook secured to and projecting laterally of said sleeve; and a nut on said rod for moving said sleeve toward said first hook.

6. Structure as specified in claim 1 in which said clamp means includes a rod having right- and left-hand threaded end portions; and a nut on the respective end portions of said rod.